United States Patent
Matsuda et al.

(10) Patent No.: US 9,349,509 B2
(45) Date of Patent: May 24, 2016

(54) WIRE HARNESS AND MANUFACTURING METHOD FOR WIRE HARNESS

(71) Applicant: SUMITOMO WIRING SYSTEMS, LTD., Mie (JP)

(72) Inventors: Toru Matsuda, Mie (JP); Takaaki Fukui, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/391,031

(22) PCT Filed: Dec. 27, 2012

(86) PCT No.: PCT/JP2012/083877
§ 371 (c)(1),
(2) Date: Oct. 7, 2014

(87) PCT Pub. No.: WO2013/157169
PCT Pub. Date: Oct. 24, 2013

(65) Prior Publication Data
US 2015/0060109 A1    Mar. 5, 2015

(30) Foreign Application Priority Data
Apr. 20, 2012 (JP) ................... 2012-096293

(51) Int. Cl.
*H02G 3/00* (2006.01)
*H02G 3/02* (2006.01)
(Continued)

(52) U.S. Cl.
CPC ............ *H01B 17/06* (2013.01); *B60R 16/0207* (2013.01); *H02G 3/0487* (2013.01); *H01B 13/01263* (2013.01)

(58) Field of Classification Search
CPC ......... H02G 3/06; H02G 3/04; H02G 3/0616; H02G 3/0462; H02G 3/0487; F16L 13/02; F16L 21/00; F16L 23/036; F16L 57/00; B60R 16/02; B60R 16/0215; B60R 16/0207; H01B 7/00; H01B 7/20; H01B 13/262; H01B 11/1016; H01B 11/1091; H01B 17/06; H01B 13/01263; H01B 13/648
USPC ...... 174/68.1, 68.3, 72 A, 135, 19, 36, 117 F, 174/74 R, 88 R, 70 C, 95; 248/68.1, 49, 74.1
See application file for complete search history.

(56) References Cited

U.S. PATENT DOCUMENTS 4,737,598 A * 4/1988 O'Connor .......... H01B 11/1091
174/36
5,416,268 A * 5/1995 Ellis .................. H01B 11/1016
174/117 F (Continued)

FOREIGN PATENT DOCUMENTS

JP          11-353952       12/1999
JP          2011-138641     7/2011

(Continued)

*Primary Examiner* — Angel R Estrada
(74) *Attorney, Agent, or Firm* — Greenblum & Bernstein, P.L.C.

(57) ABSTRACT

A wire harness includes a wire bundle, an elongated object, and a covering member. The covering member is made of a single sheet-shaped nonwoven member and covers the wire bundle and the elongated object. The covering member includes a first portion that is wound around the wire bundle and is hot-pressed, and a second portion that is continuous with the first portion and that covers the elongated object on the first portion.

4 Claims, 5 Drawing Sheets

(51) Int. Cl.
*H01B 17/06* (2006.01)
*H02G 3/04* (2006.01)
*B60R 16/02* (2006.01)
*H01B 13/012* (2006.01)

(56) References Cited

U.S. PATENT DOCUMENTS

| | | | |
|---|---|---|---|
| 5,940,962 A * | 8/1999 | Shima | B60R 16/0215 174/72 A |
| 7,105,746 B2 * | 9/2006 | Shimura | H01R 13/648 174/117 F |
| 8,674,228 B2 * | 3/2014 | Dion | H01B 13/262 174/36 |
| 8,757,215 B2 * | 6/2014 | Burdy | H02G 3/0487 174/19 |
| 2013/0075155 A1 | 3/2013 | Kawai et al. | |
| 2013/0098660 A1 | 4/2013 | Igarashi et al. | |

FOREIGN PATENT DOCUMENTS

| | | |
|---|---|---|
| JP | 2012-005165 | 1/2012 |
| JP | 2012/039782 | 2/2012 |
| WO | 2012/020596 | 2/2012 |

* cited by examiner

WIRE HARNESS AND MANUFACTURING METHOD FOR WIRE HARNESS

TECHNICAL FIELD

The present invention relates to a wire harness.

BACKGROUND ART

Conventionally, various techniques for wire harnesses have been proposed. For example, Patent Document 1 describes a wire harness in which a wire bundle is covered by a covering member. The covering member described in Patent Document 1 is produced by hot-pressing a nonwoven member. In the wire harness described in Patent Document 1, an elongated object such as a washer hose for supplying a washer fluid is held by an elongated object fixing portion that is provided on the covering member.

CITATION LIST

Patent Document

Patent Document 1: JP 2012-5165A

SUMMARY OF INVENTION

Technical Problem

For a wire harness including a wire bundle and an elongated object, such as the one described in Patent Document 1, it is desirable to protect the elongated object in a simplest possible manner and make the elongated object more difficult to be separated from the wire harness.

Therefore, the present invention has been made in view of the above-described problems, and it is an object of the invention to provide a technique that enables easy protection of an elongated object and makes the elongated object more difficult to be separated from the wire harness.

Solution to Problem

A wire harness according to a first aspect is a wire harness including: a wire bundle; an elongated object; and a covering member that is made of a single sheet-shaped nonwoven member and that covers the wire bundle and the elongated object, the covering member including: a first portion that is wound around the wire bundle and hot-pressed; and a second portion that is continuous with the first portion and that covers the elongated object on the first portion.

A wire harness according to a second aspect is the wire harness according to the first aspect, wherein the second portion is hot-pressed.

A method for manufacturing a wire harness according to a third aspect is a method for manufacturing a wire harness, including the steps of: (a) hot-pressing a first portion of a single sheet-shaped nonwoven member in a state in which the first portion is wound around a wire bundle; and (b) placing, after the step (a), an elongated object on the first portion and covering the elongated object by a second portion that is continuous with the first portion of the nonwoven member.

A method for manufacturing a wire harness according to a fourth aspect is the method for manufacturing a wire harness according to the third aspect, further including the step of (c) hot-pressing the second portion after the step (b).

Advantageous Effects of Invention

According to the first to fourth aspects, the single sheet-shaped nonwoven member covering the wire bundle also covers the elongated object, and it is thus possible to easily protect the elongated object and make the elongated object more difficult to be separated from the wire harness.

According to the second and third aspects in particular, hot-pressing the second portion that covers the elongated object makes it possible to bring the second portion into close contact with the first portion that is wound around the wire bundle. Accordingly, it is possible to suppress generation of an unusual sound caused by movement of the elongated object, and a change in the path of the elongated object.

Objects, features, aspects, and advantages of the present invention will become more apparent from the following detailed description and the accompanying drawings.

DESCRIPTION OF EMBODIMENTS

Figure 1:
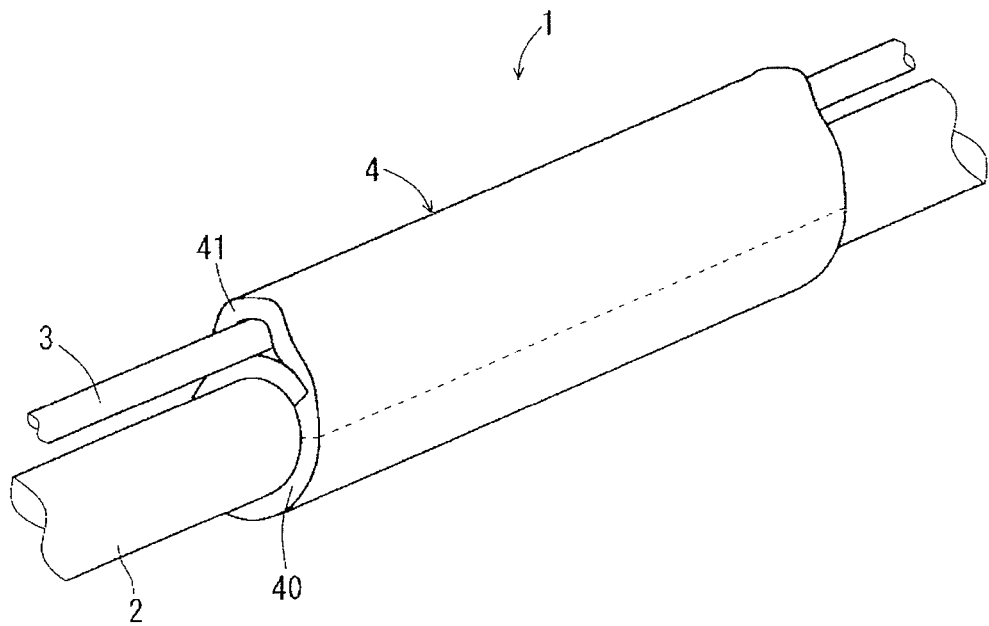
FIG. 1 is a perspective view showing a wire harness.
Figure 2:
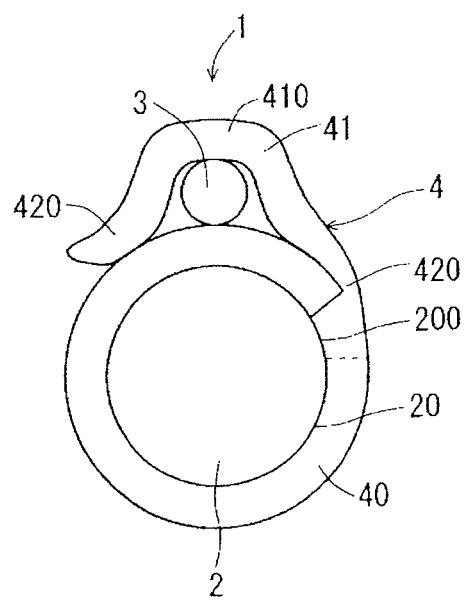
FIG. 2 is a side view showing the wire harness.

FIG. 1 is a perspective view showing a wire harness 1 according to an embodiment. FIG. 2 is a side view of the wire harness 1 as viewed from its extension direction. The wire harness 1 according to the present embodiment is routed, for example, in a vehicle such as an automobile.

As shown in FIGS. 1 and 2, the wire harness 1 includes a wire bundle 2 in which a plurality of wires are bound together, an elongated object 3, and a covering member 4 covering the wire bundle 2 and the elongated object 3.

The elongated object 3 is, for example, an antenna feeder line, a trunk opener cable, or a washer tube. The elongated object 3 extends along the extension direction of the wire bundle 2.

The covering member 4 has the function of limiting the path of the wire bundle 2 and the elongated object 3 when the wire harness 1 is routed, for example, in a vehicle, and the function of protecting the wire bundle 2 and the elongated object 3 from any interfering object around the wire harness 1. The covering member 4 is formed by hot-pressing a single sheet-shaped nonwoven member 100. The nonwoven member 100 may be formed of only a single non-woven fabric, or may be a single sheet-shaped member formed of a plurality non-woven fabric sheets that are placed on top of one another.

As used herein, "hot-pressing" refers to molding a nonwoven member by sandwiching the nonwoven member between dies, and pressurizing the dies in a heated state. As the nonwoven member, it is possible to use a nonwoven member capable of hardening through a heating step. As such a nonwoven member, it is possible to use a member including elementary fibers and an adhesive resin (also called a binder) entangled therewith. The adhesive resin is a resin having a lower melting point (e.g., 110° C. to 115° C.) than the melting point of the elementary fibers. When the nonwoven member is heated to a temperature that is lower than the melting point of the elementary fibers and is higher than the melting point of the adhesive resin, the adhesive resin melts and penetrates between the elementary fibers. Afterward, when the temperature of the nonwoven member becomes lower than the melting point of the adhesive resin, the adhesive resin solidifies in a state in which the elementary fibers are bonded to each other. Thereby, the nonwoven member becomes harder than it was before heating, and its molded shape during heating is maintained.

The elementary fibers may be any fibers as long as they are capable of maintaining their fibrous state at the melting point of the adhesive resin, and it is possible to use various types of fibers, in addition to resin fibers. As the adhesive resin, it is possible to use thermoplastic resin fibers having a lower melting point than the melting point of the elementary fibers. The adhesive resin may be in a granular or fibrous form. Alternatively, an adhesive resin layer may be formed on the outer circumference of a core fiber to form a binder fiber, and this binder fiber may be entangled with the elementary fibers. As the core fiber used in this case, the same materials as those of the above-described elementary fibers may be used.

Examples of the combination of the elementary fibers and the adhesive resin include a combination of PET (polyethylene terephthalate) resin fibers serving as the elementary fibers and a copolymer resin of PET and PEI (polyethylene isophthalate) serving as the adhesive resin. In this case, the melting point of the elementary fibers is approximately 250° C., and the melting point of the adhesive resin is 110° C. to 150° C. Accordingly, when the nonwoven member is heated to a temperature of 110° C. to 250° C., the adhesive resin melts and penetrates between the elementary fibers, which maintain their fibrous form without melting. Then, when the temperature of the nonwoven member becomes lower than the melting point of the adhesive resin, the adhesive resin solidifies in a state in which the elementary fibers are bonded to each other, as a result of which the nonwoven member becomes harder and the molded shape during heating is maintained.

The covering member 4 includes a first portion 40 that is wound around the wire bundle 2 and hot-pressed, and a second portion 41 that is continuous with the first portion 40 and that covers the elongated object 3 on the first portion 40. The dashed lines in FIGS. 1 and 2 indicate the boundary between the first portion 40 and the second portion 41. The first portion 40 covers substantially the entire perimeter of a part of the wire bundle 2 in the extension direction. The second portion 41 is continuous with one end of the first portion 40 in a direction along the circumferential direction of the wire bundle 2, and covers a part, in the extension direction, of the elongated object 3 on the first portion 40 wound around the wire bundle 2. As shown in FIG. 2, in the second portion 41, a part 420 other than a part 410 surrounding the elongated object 3 is in close contact (areal contact) with the first portion 40, and is in close contact with an area 200 that is not covered by the first portion 40 on a part, in the extension direction of the wire bundle 2, of the outer circumferential surface 20 onto which the first portion 40 is attached.

Figure 3:
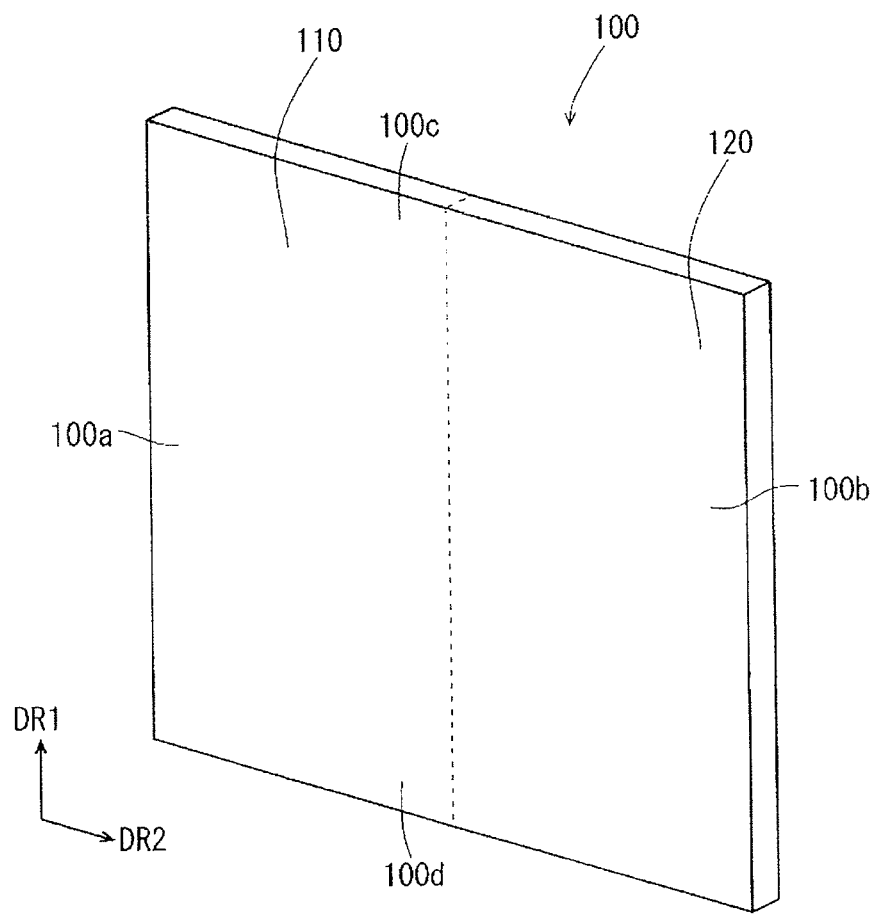
FIG. 3 is a perspective view showing an example of a nonwoven member.

Next, a method for manufacturing the wire harness 1 according to the present embodiment will be described. FIG. 3 is a diagram showing an example of the nonwoven member 100 used as the material of the covering member 4. The nonwoven member 100 shown in FIG. 3 is a rectangular sheet-shaped member. Note that the nonwoven member 100 may have a shape other than a rectangular shape.

The nonwoven member 100 includes a first end portion 100a and a second end portion 100b extending along a first direction DR1 that is perpendicular to its thickness direction, and a third end portion 100c and a fourth end portion 100d extending along a second direction DR2 that is perpendicular to the thickness direction and the first direction DR1.

In the nonwoven member 100, a rectangular sheet-shaped first portion 110 that includes the first end portion 100a, about a half of the third end portion 100c on the first end portion 100a side, and about a half of the fourth end portion 100d on the first end portion 100a side will constitute the first portion 40 of the covering member 4. Also, in the nonwoven member 100, the part other than the first portion 110, or in other words, a rectangular sheet-shaped second portion 120 that includes the second end portion 100b, about a half of the third end portion 100c on the second end portion 100b side, and about a half of the fourth end portion 100d on the second end portion 100b side will constitute the second portion 41 of the covering member 4. The first portion 110 and the second portion 120 are adjacent to each other in the second direction DR2, and one end of the first portion 110 in the second direction DR2 and one end of the second portion 120 in the second direction DR2 are continuous with each other. The dashed line shown in FIG. 3 indicates the boundary between the first portion 110 and the second portion 120. In the present embodiment, both of the first portion 110 and the second portion 120 of the nonwoven member 100 are hot-pressed using different dies.

Figure 4:
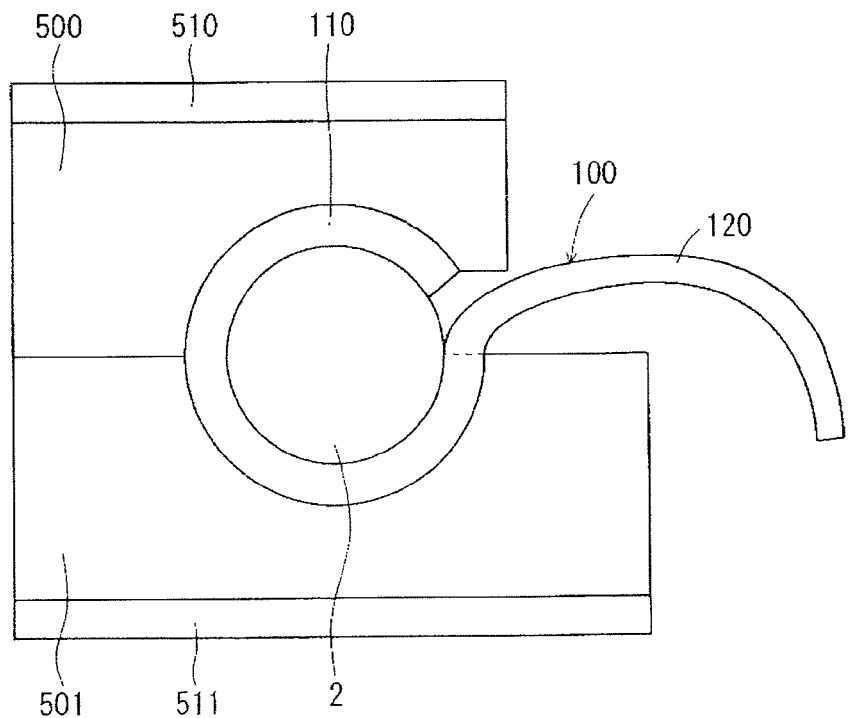
FIG. 4 is a diagram illustrating a method for manufacturing a wire harness.
Figure 5:
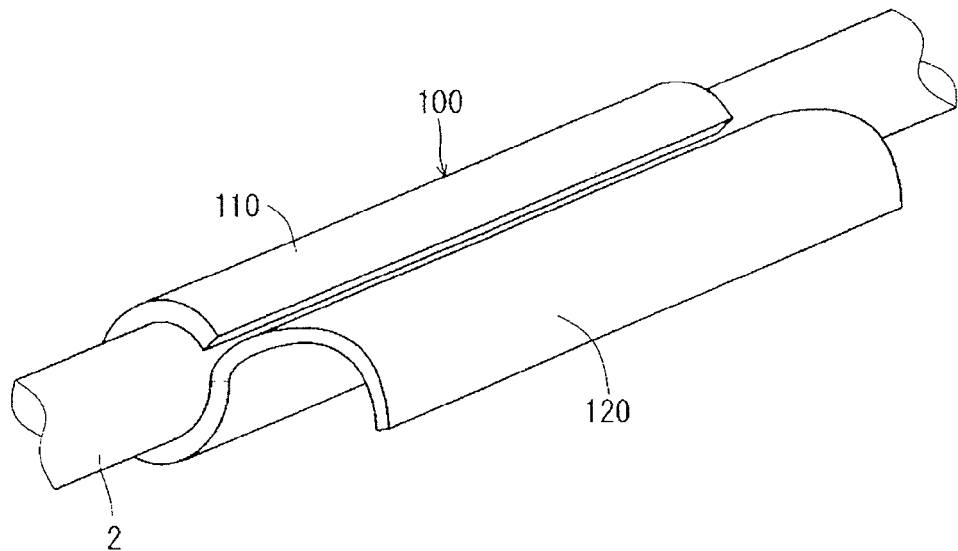
FIG. 5 is a diagram illustrating the method for manufacturing a wire harness.

To manufacture the wire harness 1 shown in FIGS. 1 and 2, first, the first portion 110 is sandwiched between an upper die 500 and a lower die 501 in a state in which the first portion 110 of the nonwoven member 100 is wound around the wire bundle 2. Then, the upper die 500 and the lower die 501 are pressurized in a state in which each of the upper die 500 and the lower die 501 is heated. FIG. 4 shows how the upper die 500 and the lower die 501 are pressurized in a state in which each of the upper die 500 and the lower die 501 is heated. Heaters 510 and 511 are attached to the upper die 500 and the lower die 501, respectively. The upper die 500 and the lower die 501 are heated by the heaters 510 and 511, respectively. Thereby, the first portion 110 sandwiched between the upper die 500 and the lower die 501 hardens as a result of being hot-pressed (heated and pressurized) in a state of being wound around the wire bundle 2. FIG. 5 is a perspective view showing the wire bundle 2 and the nonwoven member 100 after the first portion 110 has been hot-pressed. Although the first portion 110 is hot-pressed in a state of being wound around the wire bundle 2 only once in the present example, the first portion 110 may be hot-pressed in a state of being wound around the wire bundle 2 a plurality of times. The dashed lines in FIGS. 4 and 5 and FIGS. 6 to 8, which will be described below, indicate the boundary between the first portion 110 and the second portion 120.

Figure 6:
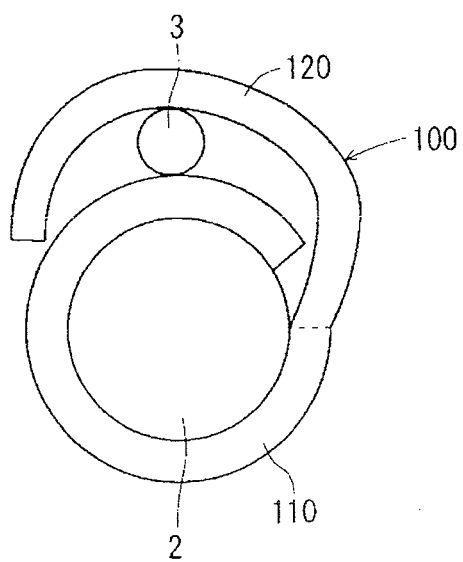
FIG. 6 is a diagram illustrating the method for manufacturing a wire harness.
Figure 7:
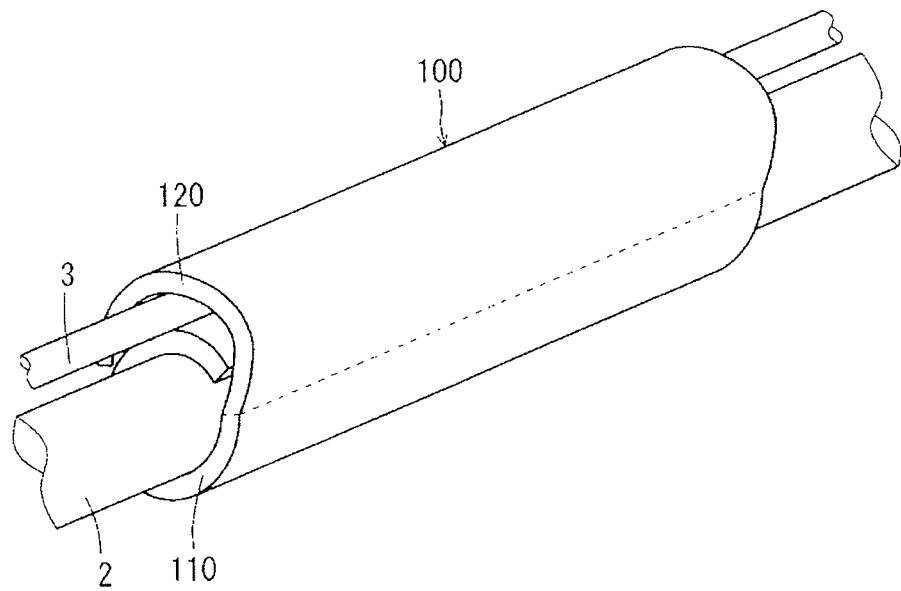
FIG. 7 is a diagram illustrating the method for manufacturing a wire harness.

Next, as shown in FIGS. 6 and 7, an elongated object 3 is placed on the first portion 110, which has been wound around the wire bundle 2 and hot-pressed, such that the elongated object 3 extends along the extension direction of the wire bundle 2. Then, the elongated object 3 on the first portion 110 is covered by the second portion 120 such that the second portion 120, which has not been hot-pressed and is thus soft, is placed on top of a part of the first portion 110.

Figure 8:
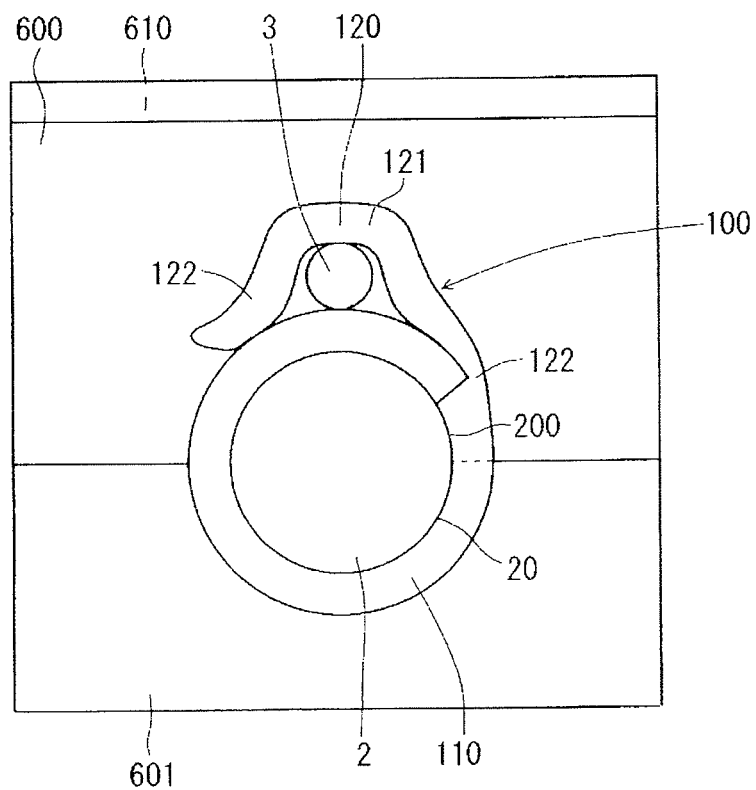
FIG. 8 is a diagram illustrating the method for manufacturing a wire harness.

Next, the second portion 120 and the first portion 110 (the nonwoven member 100 covering the wire bundle 2 and the elongated object 3) are sandwiched between an upper die 600 and a lower die 601 such that the upper die 600 covers the second portion 120. Then, the upper die 600 and the lower die 601 are pressurized such that the entire second portion 120 is pressed toward the wire bundle 2 by the heated upper die 600. FIG. 8 is a diagram showing how the upper die 600 and the lower die 601 are pressurized in a state in which the upper die 600 is heated. A heater 610 is attached to the upper die 600, and the upper die 600 is heated by the heater 610. Thereby, the entire second portion 120 covering the elongated object 3 hardens as a result of being hot-pressed (heated and pressurized) in a state of being pressed toward the wire bundle 2. Consequently, as shown in FIG. 8, a part 122 that is other than a part 121 (part located around the elongated object 3) covering the elongated object 3 in the second portion 120 is in close contact with the first portion 110, and is in close contact with the area 200 that is not covered by the first portion 110 on a part, in the extension direction of the wire bundle 2, of the outer circumferential surface 20 onto which the first portion 110 is attached. Accordingly, the gap between the second portion 120 and the first portion 110 is smaller than it was before the second portion 120 was hot-pressed. Upon completion of hot-pressing of the second portion 120, the wire harness 1 is completed as shown in FIGS. 1 and 2.

As described above, according to the present embodiment, the single sheet-shaped nonwoven member 100 covering the wire bundle 2 also covers the elongated object 3, and it is thus possible to easily protect the elongated object 3 and make the elongated object 3 more difficult to be separated from the wire harness 1.

Furthermore, as described above, hot-pressing the second portion 120 (second portion 41) covering the elongated object 3 on the first portion 110 (first portion 40) enables the second portion 120 to be brought into close contact with the first portion 110 located therebelow. Accordingly, it is possible to suppress movement of the elongated object 3 within the covering member 4 in the wire harness 1. As a result, it is possible to suppress generation of an unusual sound and a change in the path of the elongated object 3. If the path of the elongated object 3 changes, the elongated object 3 may not reach a given location when the wire harness 1 is routed in a vehicle or the like. For this reason, it is desirable to suppress a change in the path of the elongated object 3 in the above-described manner.

Note that the second portion 120 of the nonwoven member 100 may not be hot-pressed. In this case, the elongated object 3 on the first portion 110 is covered by the second portion 120 as shown in FIGS. 6 and 7, and thereafter, the second portion 120 and the first portion 110 may be bonded to each other with a double-sided adhesive tape or the like. Specifically, one of both end portions of the second portion 120 in a direction along the circumferential direction of the wire bundle 2 that is on the opposite side of the end portion continuous with the first portion 110 is bonded to the first portion 110 with a double-sided adhesive tape or the like. At this time, it is preferable to reduce the gap between the second portion 120 and the first portion 110 as much as possible by, for example, pulling the end portion, which is to be bonded to the first portion 110, of the second portion 120 along the circumferential direction of the wire bundle 2 when bonding that end portion to the first portion 110. This makes it possible to suppress movement of the elongated object 3 within the covering member 4 in the wire harness 1, thus suppressing generation of an unusual sound and a change in the path of the elongated object 3.

While the present invention has been described in detail, the foregoing description is in all aspects illustrative and the invention is not limited thereto. It will be appreciated that numerous modifications not illustrated herein can be made without departing from the scope of the present invention.

REFERENCE SIGNS LIST

1 Wire harness
2 Wire bundle
3 Elongated object
4 Covering member
100 Nonwoven member
40, 110 First portion
41, 120 Second portion

The invention claimed is:
1. A wire harness comprising:
a wire bundle;
an elongated object; and
a covering member that is made of a single sheet-shaped nonwoven member and that covers the wire bundle and the elongated object,
the covering member including:
a first portion that is wound around the wire bundle and hot-pressed, the first portion covering substantially the entire perimeter of a portion in the extension direction of the wire bundle; and
a second portion that is continuous with the first portion and that covers the elongated object on the first portion, the second portion including a first part proximate the first portion and contacting the wire bundle and the first portion, and the second portion including a second part surrounding the elongated object on the first portion.
2. The wire harness according to claim 1, wherein the second portion is hot-pressed.
3. A method for manufacturing a wire harness, comprising:
hot-pressing a first portion of a single sheet-shaped nonwoven member in a condition in which the first portion is wound around a wire bundle and covering substantially the entire perimeter of a portion in the extension direction of the wire bundle; and
placing an elongated object on the hot-pressed first portion and covering the elongated object with a second portion that is continuous with the first portion of the nonwoven member, the second portion including a first part proximate the first portion and contacting the wire bundle and the first portion, and the second portion including a second part surrounding the elongated object on the first portion.
4. The method for manufacturing a wire harness according to claim 3, further comprising hot-pressing the second portion covering the elongated object.

* * * * *